(12) United States Patent
Petutsching et al.

(10) Patent No.: US 7,430,994 B2
(45) Date of Patent: Oct. 7, 2008

(54) CYLINDER HEAD AND COMBUSTION ENGINE COMPRISING A CYLINDER HEAD

(75) Inventors: Wolfgang Petutsching, Graz (AT); Karl Kirchweger, Graz (AT); Rickard Svensson, Göteborg (SE); Bertil Andersson, Kungsbacka (SE)

(73) Assignee: AB Volvo Penta, Gothenburg (SE)

( * ) Notice: Subject to any disclaimer, the term of this patent is extended or adjusted under 35 U.S.C. 154(b) by 0 days.

(21) Appl. No.: 11/306,184

(22) Filed: Dec. 19, 2005

(65) Prior Publication Data

US 2006/0254272 A1 Nov. 16, 2006

Related U.S. Application Data

(63) Continuation of application No. PCT/SE2004/000914, filed on Jun. 11, 2004, now abandoned.

(30) Foreign Application Priority Data

Jun. 19, 2003 (EP) ................... 03076917

(51) Int. Cl.
*F02F 1/40* (2006.01)
(52) U.S. Cl. .............................................. 123/41.82 R
(58) Field of Classification Search .......... 123/41.82 R; 440/88 C, 88 D, 88 J, 89 R, 89 B, 89 C
See application file for complete search history.

(56) References Cited

U.S. PATENT DOCUMENTS

| | | | |
|---|---|---|---|
| 4,187,678 A | | 2/1980 | Herenius |
| 5,036,804 A | | 8/1991 | Shibata |
| 5,950,425 A | * | 9/1999 | Takahashi et al. ............. 60/321 |
| 5,970,926 A | * | 10/1999 | Tsunoda et al. .......... 123/41.29 |
| 6,186,846 B1 | * | 2/2001 | Takayanagi ............... 440/89 R |
| 6,338,660 B1 | * | 1/2002 | Fukuda ..................... 440/89 R |
| 6,511,356 B2 | * | 1/2003 | Yukishima ................ 440/89 R |
| 6,634,913 B2 | * | 10/2003 | Shibata et al. ............ 440/88 C |
| 6,732,679 B2 | * | 5/2004 | Iizuka ........................ 123/41.1 |
| 7,044,088 B2 | * | 5/2006 | Aketa et al. .............. 123/41.18 |
| 7,056,170 B2 | * | 6/2006 | Tawa et al. ................ 440/88 R |
| 2002/0173208 A1 | * | 11/2002 | Yonezawa et al. ............. 440/88 |

FOREIGN PATENT DOCUMENTS

EP   1 258 613 A2   11/2002

* cited by examiner

*Primary Examiner*—Hai H Huynh
(74) *Attorney, Agent, or Firm*—Novak Druce + Quigg LLP (57) ABSTRACT

A cylinder head (1) for an internal combustion engine, the cylinder head (1) having a top face (1*a*), a bottom face (1*b*) arranged to be connected to a cylinder block, a lateral exhaust flange face (1*c*) arranged to be connected to an exhaust manifold (17), a second lateral face (1*d*) being opposed to said lateral exhaust flange face (1*c*), a front face (1*e*) and an end face (1*f*).

13 Claims, 6 Drawing Sheets

CYLINDER HEAD AND COMBUSTION ENGINE COMPRISING A CYLINDER HEAD

CROSS-REFERENCE TO RELATED APPLICATIONS

The present application is a continuation patent application of International Application No. PCT/SE2004/000914 filed 11 Jun. 2004 which was published in English pursuant to Article 21(2) of the Patent Cooperation Treaty and which claims priority to European Application No. 03076917.8 filed 19 Jun. 2003. Said applications are expressly incorporated herein by reference in their entireties.

TECHNICAL FIELD OF THE INVENTION

The invention relates to a cylinder head of an internal combustion engine, and more particularly to a cylinder head having outlet ports connected to a coolant chamber of the cylinder head, which outlet ports are arranged to be connected to inlets arranged on an exhaust manifold cooling jacket.

BACKGROUND OF THE INVENTION

Marine propulsion systems are frequently mounted in environments sensitive to excessive heating. For this reason are exhaust manifolds and turbo units frequently connected to a liquid coolant system.

Examples are provided in U.S. Pat. No. 5,109,668 and U.S. Pat. No. 4,179,884 where marine propulsion systems are described whose exhaust manifolds are surrounded by water jackets for reasons of safety.

U.S. Pat. No. 4,977,741 describes an exhaust system combining an exhaust manifold and exhaust elbow, where the manifold is surrounded by a first water jacket and the elbow by a second water jacket. First and second water jackets are separated by a dam containing a passage for fluid communication between them. This will permit different temperature regions to be established in the exhaust system and prevent the formation of condensate due to excessive cooling of the exhaust gases.

In conventional applications, the coolant is recirculated to the coolant system from the cooling jacket of the exhaust manifold by way of external channels arranged outside of the cylinder head. As a consequence, construction volume is increased and more space is required.

SUMMARY OF INVENTION

It is an object of this invention to avoid the above disadvantages and provide a cylinder head that allows a compact layout of a coolant system.

A cylinder head for a liquid cooled engine normally includes a coolant chamber, which is arranged to cool exhaust channels arranged in the cylinder head. The coolant chamber of the cylinder head is provided with inlet openings normally being connected to outlet openings of a coolant chamber arranged in a cylinder block. The coolant chamber of the cylinder head further includes outlet ports at which the coolant liquid leaves the cylinder head to coolant ducts arranged outside of the cylinder head.

According to the invention, the cylinder head is provided with an integral coolant crossover passage providing a first port for connection to a first exhaust manifold cooling jacket outlet and extending between said first port arranged at said lateral exhaust flange face and a first coolant outlet arranged at another of said faces.

A coolant crossover passage is a return flow duct for coolant liquid. The coolant liquid according to the invention has preferably first passed a coolant chamber of the cylinder head, being further directed externally of the cylinder head, preferably to a coolant chamber of a turbo unit, to return via the coolant crossover passage.

Herein, it is meant when stating that the coolant crossover passage is integral that the channel is formed in the die cast block that forms the cylinder head. The passage is preferably formed when casting the cylinder head, but could optionally be cut out from the die cast block forming the cylinder head.

The integral coolant crossover passage according to the invention is arranged to lead the return flow from an exhaust manifold cooling jacket through the cylinder head. This construction eliminates the need for arranging return flow conduits, as is done in prior art engine layouts, on top or beside the cylinder head. The invention thereby results in a compact engine design.

In addition to the compact size obtained in this way, this design has the advantage that certain components may be eliminated. This will be possible above all if the cylinder head is provided with a preferably integral coolant short-circuiting passage at its first front end, which may connect the cooling jacket to a coolant pump.

Preferably, the coolant crossover passage and a coolant short circuiting passage will depart from the exhaust flange face. Effective cooling of the exhaust manifold is achieved by providing the exhaust flange face preferably for each cylinder with at least one inlet opening into the coolant chamber for fluid communication between the coolant chamber and the cooling jacket.

In a most compact variant of the invention, the coolant crossover passage extends to an inlet flange face of an inlet manifold. Even more space will be saved if the coolant short-circuiting passage extends to a cylinder head sealing face sealing a crankcase.

The integral coolant crossover passage preferably leads between two opposed longitudinal sides of the cylinder head. The crossover passage links the coolant outlet duct of the exhaust manifold cooling jacket to a coolant outlet duct arranged on an intake flange face arranged to be connected to an intake manifold. The integral coolant crossover passage preferably leads to a heat exchanger.

Preferably the crossover passage is provided in the vicinity of front face of the cylinder head.

The cylinder head according to a preferred embodiment which allow a particularly compact coolant system design is provided with an integral coolant short circuit passage providing a second port for connection to a second exhaust manifold cooling jacket outlet and extending between said second port arranged at said lateral exhaust flange face and a second coolant outlet duct of the cylinder head arranged at another of said faces for connection to a coolant pump inlet.

Preferably the second coolant outlet duct is arranged at a bottom face of the cylinder head. The second coolant outlet duct is connected by an inlet to a pump housing.

The cylinder head is particularly well suited for use with marine engines.

A further object of the invention is to provide an internal combustion engine allowing a compact layout of the coolant system.

Preferred embodiments with particularly effective and uniform cooling combined with a most compact engine design will be achieved by designing the cooling jacket as a main coolant passage collecting the coolant coming in from a coolant chamber arranged in the cylinder head, the cooling jacket communicating with the coolant chamber in the cylinder head via at least one inlet opening per cylinder.

Preferably, the cooling jacket is divided by at least one partitioning wall into a coolant inlet duct and a coolant outlet duct. The coolant inlet duct is connected to a set of inlets arranged on said exhaust manifold cooling jacket and leads to an outlet opening which is arranged to be connected to an inlet opening to a coolant chamber arranged in a turbocharger assembly.

The coolant outlet duct of the exhaust manifold cooling jacket extends between an inlet opening and a first outlet of said exhaust manifold cooling jacket. The first cooling jacket outlet is arranged to be connected to the first port of the integral coolant crossover passage arranged in the cylinder head and the inlet opening of the coolant outlet duct is arranged to be connected to an outlet opening from a coolant chamber arranged in a turbo assembly.

For uniform heat transfer, the coolant inlet duct and the coolant outlet duct should be flow-connected via at least one bypass opening. Temperature distribution will be even more uniform if at least one bypass opening is provided for each cylinder.

In a most compact variant of the invention, the coolant inlet duct is disposed above the coolant outlet duct. In order to achieve uniform cooling of the exhaust manifold it is particularly advantageous if the second coolant passage has a larger flow cross-section than the first coolant passage.

In view of the compact engine design desired, it will be of advantage to provide the exhaust manifold cooling jacket with a seat for heat control valve at which the coolant outlet duct is divided into a first and a second exhaust manifold cooling jacket outlets. The valve is designed to guide the coolant stream from the coolant outlet duct of the exhaust manifold cooling jacket to a coolant pump, either directly via an integral coolant short circuit passage arranged in the cylinder head, or indirectly via the coolant crossover passage and a heat exchanger.

BRIEF DESCRIPTION OF THE DRAWINGS

The invention will be described in greater detail with reference to the accompanying drawings, wherein.

DETAILED DESCRIPTION

Figure 1:
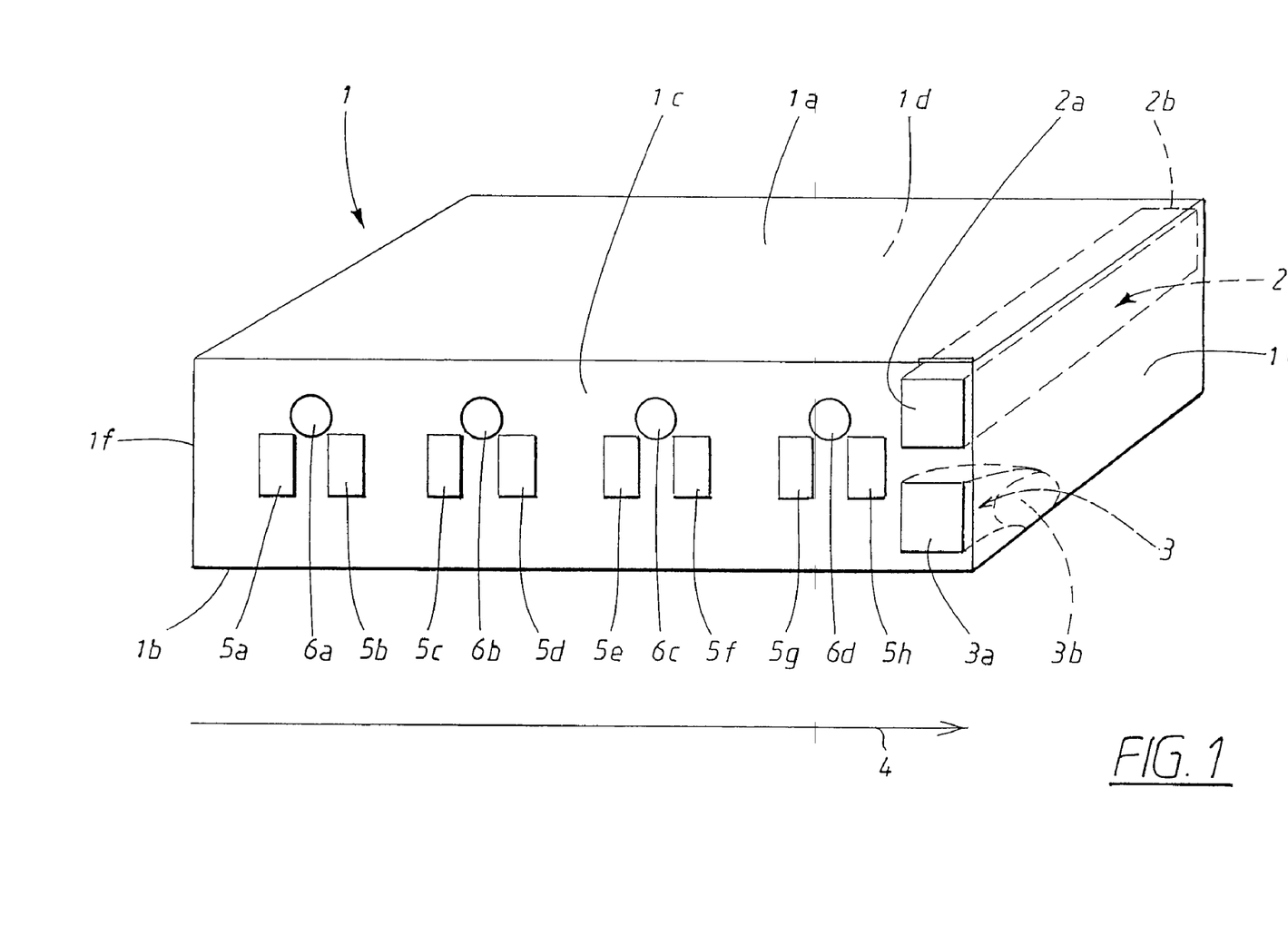
FIG. 1 is a perspective view showing a cylinder head configured according to the invention.

FIG. 1 shows a perspective view of a cylinder head 1 configured according to the invention. The cylinder head 1 has a top face 1a, a bottom face 1b arranged to be connected to a cylinder block, a lateral exhaust flange face 1c arranged to be connected to an exhaust manifold, a second lateral face 1d being opposed to said lateral exhaust flange face 1c, a front face 1e and an end face 1f.

The cylinder head 1 is provided with an integral coolant crossover passage 2 providing a first port 2a for connection to a first exhaust manifold cooling jacket outlet and extending between said first port 2a arranged at the lateral exhaust flange face 1c and a first coolant outlet 2b arranged at said second lateral face 1d, which is an inlet flange face arranged to be connected to an intake manifold 7.

The cylinder head 1 is furthermore provided with an integral coolant short circuit passage 3 providing a second port 3a for connection to a second exhaust manifold cooling jacket outlet and extending between said second port 3a arranged at said lateral exhaust flange face 1c and a second coolant out-let 3b arranged at the bottom face 1b for connection to a coolant pump inlet.

Figure 2:
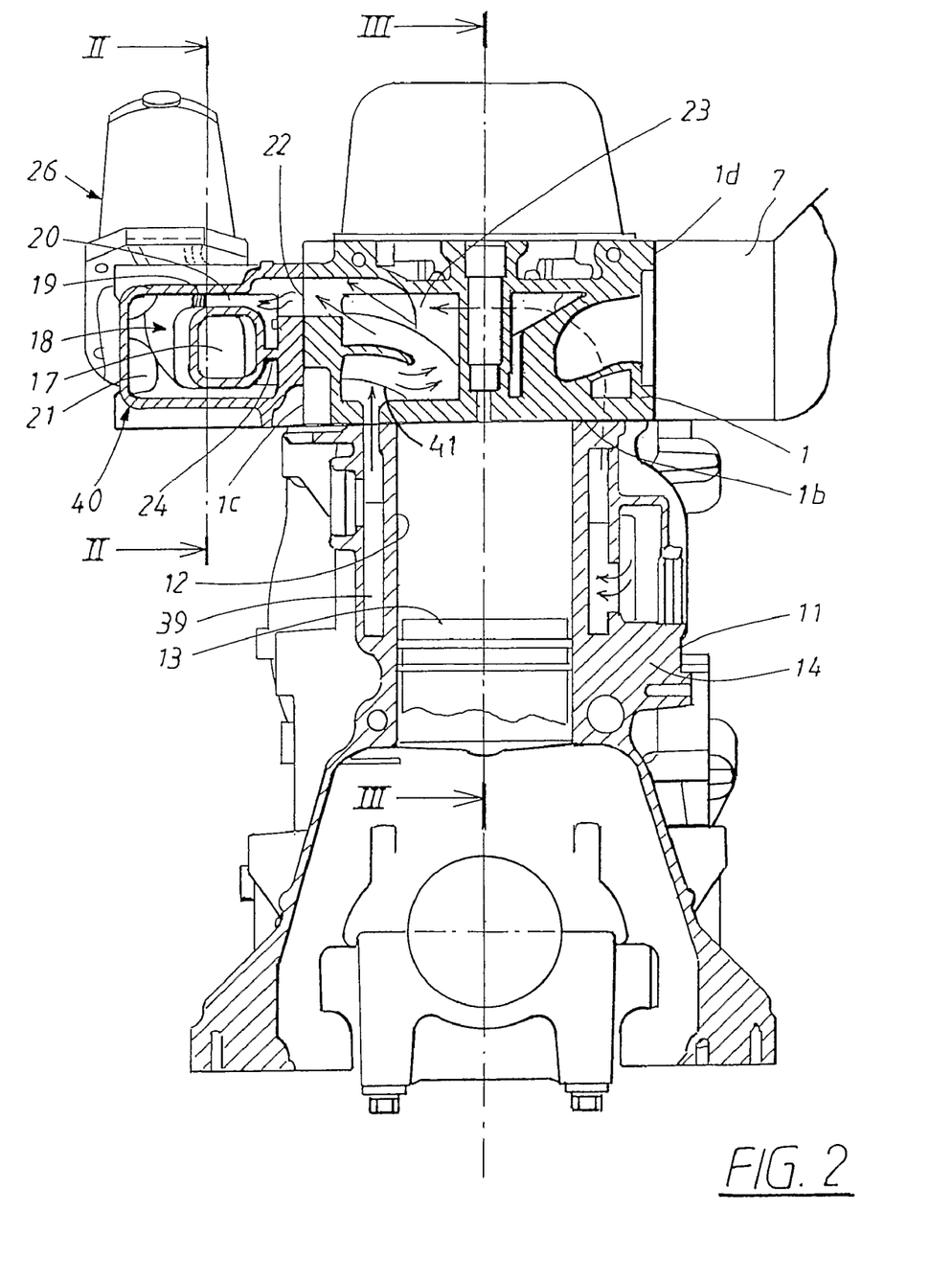
FIG. 2 is a cross-sectional view showing an internal combustion engine configured according to the invention and taken along line I-I in FIG. 3.

The cylinder head is provided with a coolant chamber 23, FIG. 2 extending along a length axis 4 of the cylinder head 1. The coolant chamber 23 is arranged for cooling a plurality of exhaust channels 5a-5h provided in the cylinder head 1. The lateral exhaust flange face 1c is provided with at least one outlet port 6a-6d for each cylinder in said plurality of exhaust channels 5a-5h. The outlet ports 6a-6d are connected to said coolant chamber and are arranged to provide connections to a corresponding set of inlets arranged on an exhaust manifold cooling jacket.

The FIGS. 2-12 show an internal combustion engine 111 in which a cylinder head 1 according to the invention is used. The internal combustion engine is provided with several cylinders 12 for reciprocating pistons 13. The engine 111 has a cylinder block 14 to which a cylinder head 1 is bolted. An exhaust manifold assembly 40 including an exhaust manifold 17 is flanged on to an exhaust flange face 1c on the side of the cylinder head 1. The exhaust manifold 17 is surrounded by a cooling jacket 18. The cooling jacket 18 is divided by a partitioning wall 19 in the flow direction of the exhaust stream into a coolant inlet duct 20 and a coolant outlet duct 21. The exhaust manifold 17 communicates with at least one exhaust port 41 per cylinder 12.

The coolant inlet duct 20 has a set of inlets 22 including at least one inlet 22a-22d per cylinder 12, which is flow-connected to the coolant chamber 23 of the cylinder head 1 via the outlet ports 6a-6d of the cylinder head 1.

The coolant inlet duct 20 leads from said set of inlets 22 to an outlet opening 20a of said coolant inlet duct. The outlet opening 20a of the coolant inlet duct 20 is connected to an inlet opening 27 to a coolant chamber 28 arranged in a turbo charger assembly 26.

The coolant outlet duct 21 extends between an inlet opening 21a of said coolant outlet duct via a thermostat space 32a at which the coolant outlet duct 21 is branched into a first and a second branch 21b, 21c provided with a first exhaust manifold cooling jacket outlet 21d and a second exhaust manifold cooling jacket outlet 21e.

The coolant inlet duct 20 is connected to the coolant outlet duct 21 via at least one bypass opening 24.

The exhaust manifold assembly 40 extends essentially along a longitudinal side of the cylinder head 1 between a front face 1e and an end face 1f.

Figure 7:
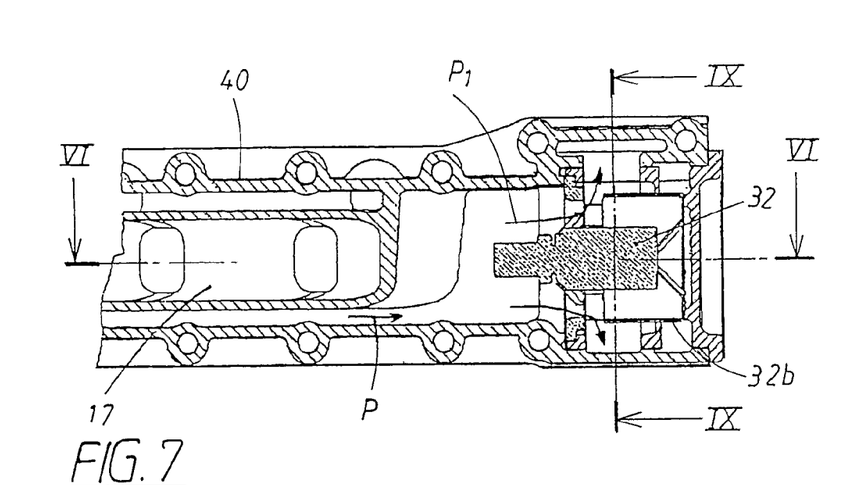
FIG. 7 is a cross-sectional view showing the exhaust manifold assembly taken along line V-V in FIG. 4.
Figure 8:
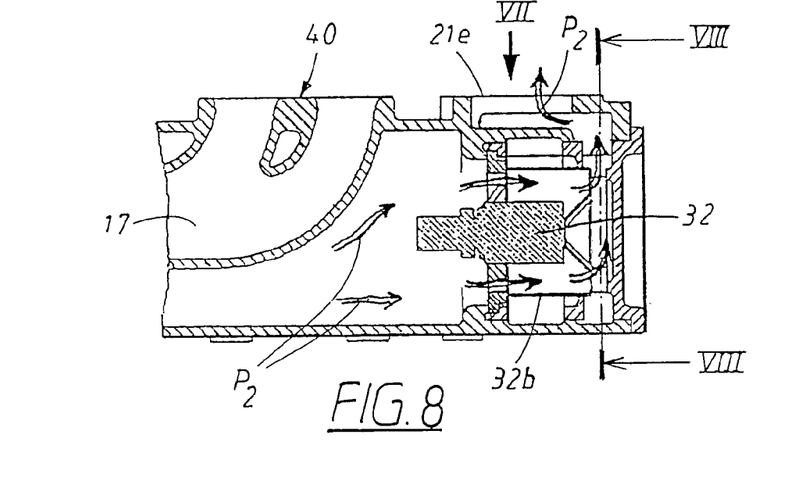
FIG. 8 is a cross-sectional view showing the exhaust manifold assembly taken along line VI-VI in FIG. 7.
Figure 9:
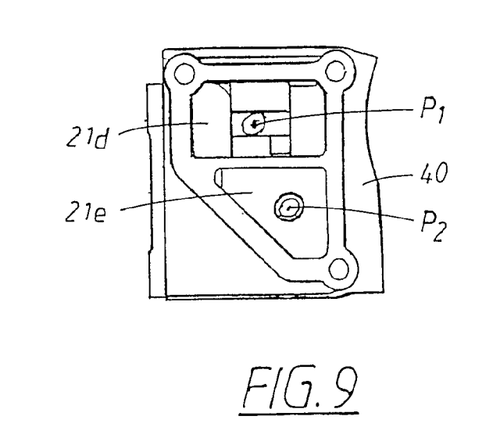
FIG. 9 is a cross-sectional view showing the exhaust manifold assembly in a view according to arrow VII in FIG. 8.
Figure 10:
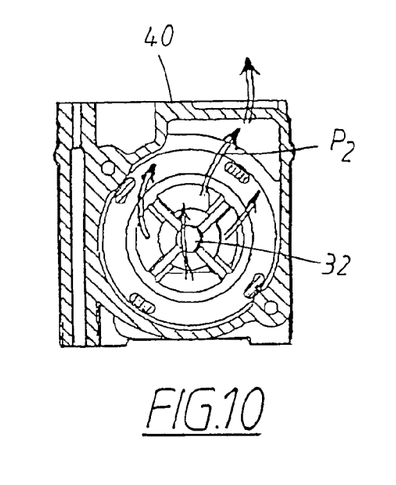
FIG. 10 is a cross-sectional view showing the exhaust manifold assembly taken along line VIII-VIII in FIG. 8.
Figure 11:
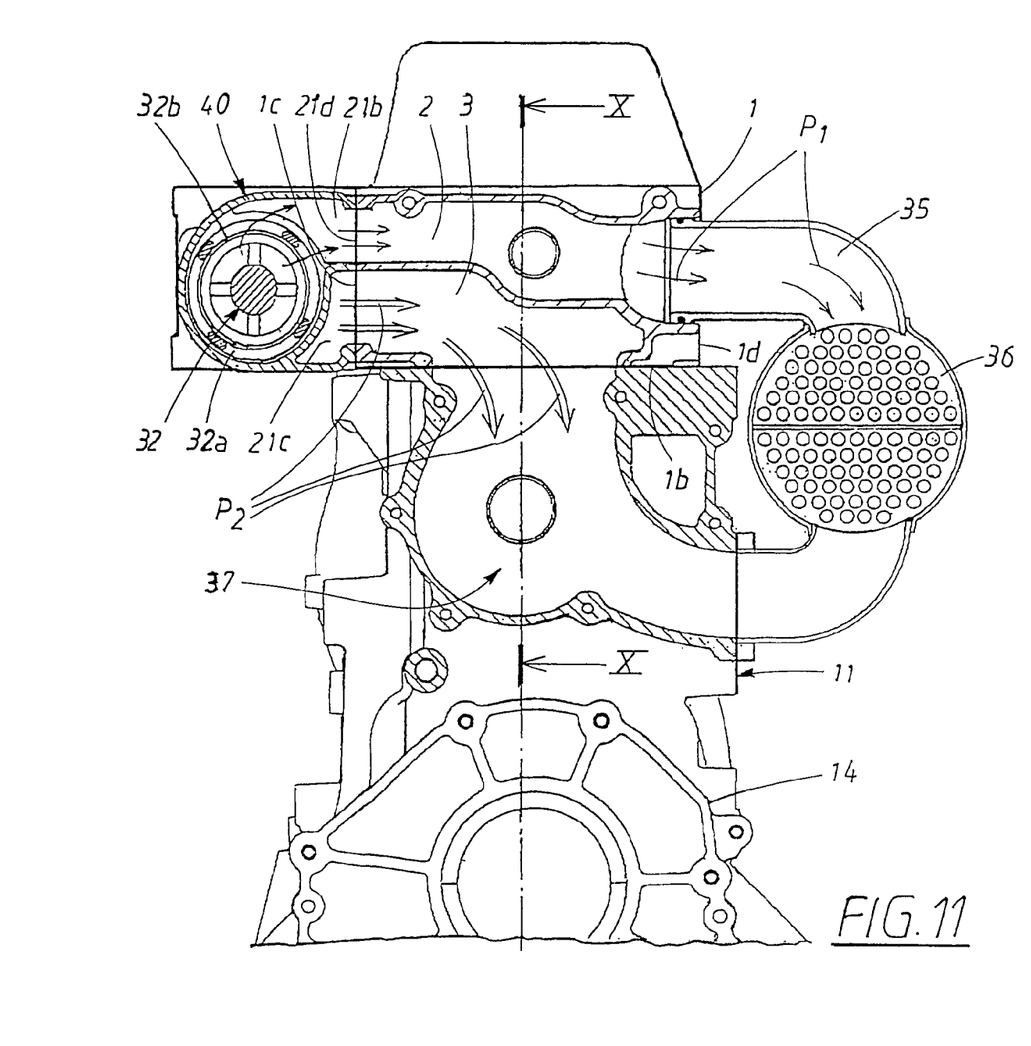
FIG. 11 is a cross-sectional view showing the engine taken along line IX-IX in FIGS. 7 and 12.
Figure 12:
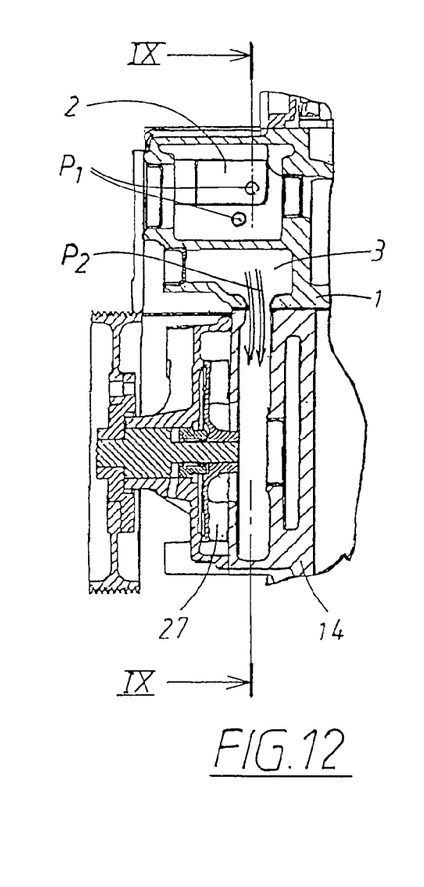
FIG. 12 is a cross-sectional view showing the engine taken along line X-X in FIG. 11.

In the region of the first end 31 of the exhaust manifold assembly 40 a thermostat space 32a is provided for a heat control valve 32, which takes the coolant stream coming in from the coolant outlet duct 21, either via a coolant crossover passage 2 situated in the area of the front face 1e of the cylinder head 1 and the coolant outlet duct 35 to the heat exchanger 36 and, further on, to the coolant pump 37, or via a coolant short-circuiting passage 3 directly to the coolant pump 37. FIG. 7 shows the position of the control valve sliding sleeve 32b when the engine is warm, FIG. 8 when the engine is cold. As indicated by arrows P1, in a hot engine the coolant will flow through the first exhaust manifold cooling jacket outlet 21d forming an upper opening to the coolant crossover passage 2. In a cold engine, however, the coolant passes through the second exhaust manifold cooling jacket outlet 21e forming a lower opening of the exhaust manifold assembly 40 into the coolant short-circuiting passage 3 (see arrows P2 in FIGS. 8-12).

The exhaust manifold 17 is connected to the turbine part 25 of a water-cooled turbocharger 26 on the side of the second end 30 of the exhaust manifold assembly 40 in the area of the end face If of the cylinder head 1. The coolant inlet 27 of the coolant chamber 28 of the turbocharger 26 is connected to the first coolant passage 20 of the exhaust manifold 17, the coolant outlet 29 to the second coolant passage 21 of the exhaust manifold 17.

The coolant flow is indicated schematically by arrows P1, P1.

Figure 3:
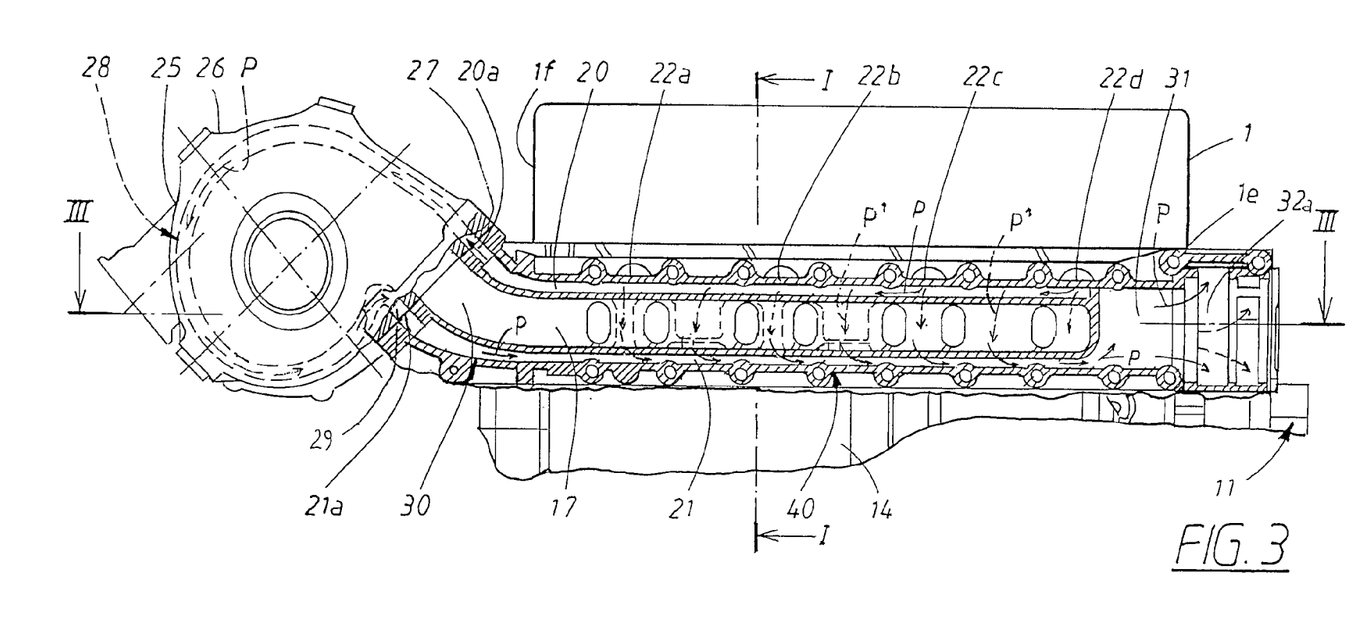
FIG. 3 is a cross-sectional view showing the engine taken along line II-II in FIG. 2.
Figure 4:
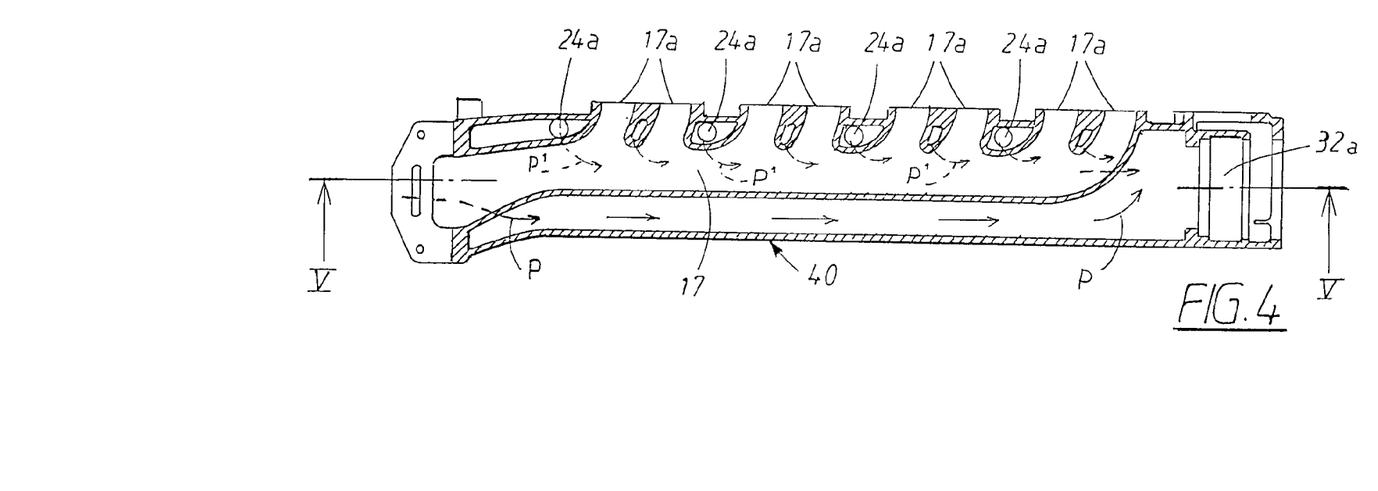
FIG. 4 is a cross-sectional view showing an exhaust manifold assembly taken along line III-III in FIG. 3.

The coolant will flow from cylinder coolant chambers 39 in the crankcase 14 into coolant chambers 23 in the cylinder head 1, from where it passes through inlets coolant chambers 23 in the cylinder head 1, from where it passes through inlets 22 into the first coolant passage 20, upon which the coolant stream is divided. The main stream in the first coolant passage 20, which is marked by full arrows P in FIG. 3, is passed to the turbine part 25 of the turbocharger 26, in the same flow direction as the exhaust gas in the exhaust manifold 17. The coolant stream flows through the coolant chambers 28 of the turbine part 25 of the turbocharger 26, and will reach the heat control valve 32 located at the front face 1e of the cylinder head 1 via the second coolant passage 21, against the flow direction of the exhaust stream.

Figure 5:
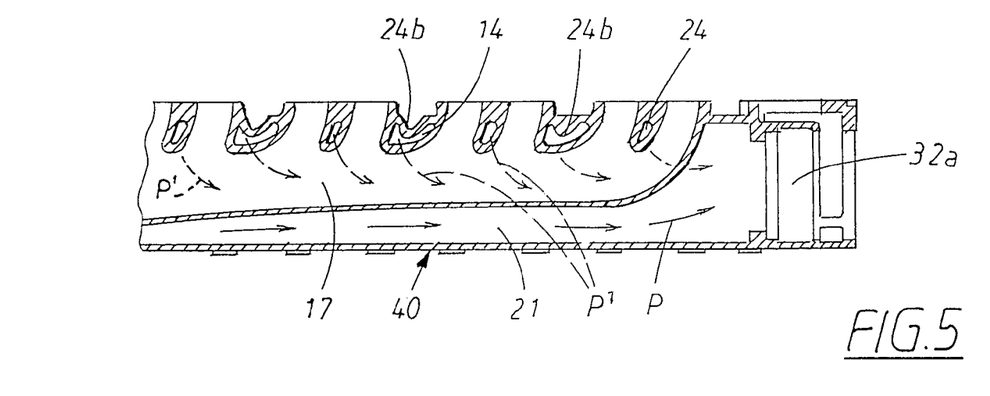
FIG. 5 is a cross-sectional view showing an exhaust manifold assembly in another variant of the invention as depicted in FIG. 4.
Figure 6:
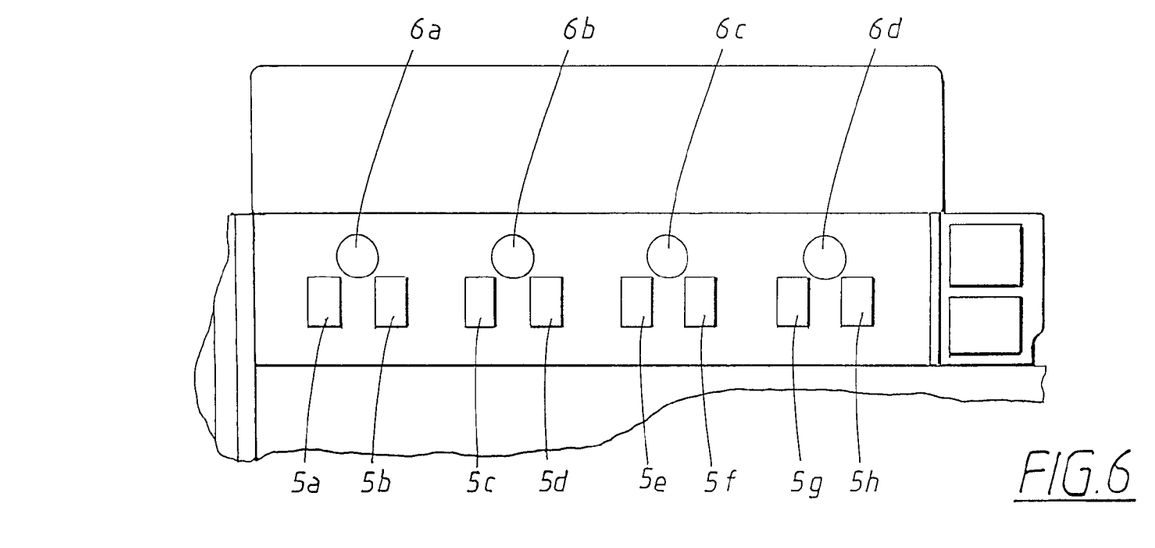
FIG. 6 shows the engine of FIG. 3, with the exhaust gas manifold removed.

On the other hand, secondary streams of the coolant will reach the second coolant passage 21 directly from the first coolant passage 20, via bypass openings 24. These secondary streams are entered in FIG. 3 by broken arrows P1. Secondary streams P1 are controlled by predefined throttle cross-sections. Throttling may be achieved by providing precisely defined openings 24a in the partitioning wall 19 (see FIG. 4), or by restricted cross-sections 24b formed integral with the bypass openings 24, as shown in FIG. 5. With the aid of the secondary streams P1 a uniform temperature distribution will be obtained in the exhaust manifold assembly 40. In addition, excessive cooling of the turbine part 25 of the turbocharger 26 will be prevented.

In dependence of the temperature of the coolant, the heat control valve 32 will direct the coolant stream P to the coolant pump 37, either directly via a short-circuiting passage 38, or indirectly via a coolant crossover passage 2. Once a certain, predefined coolant temperature is reached, the heat control valve 32 will open the flow path via the coolant crossover passage 2 to a heat ex-changer 36, in order to ensure sufficient cooling of the coolant. From the heat exchanger 36 the coolant will reach the coolant pump 37.

The coolant crossover passage 2, which departs from the exhaust flange face 1c and preferably extends to the inlet flange face 1d of an inlet manifold not shown in the drawings, is positioned at the front face 1e of the cylinder head 1, and, more preferably, cast integral therewith. The coolant short-circuiting passage 3 extending between the exhaust flange face 1c and the cylinder head sealing face 1d, is also cast integral with the cylinder head 1.

The assembly described in this application will permit uniform cooling of the exhaust manifold assembly 40 in a simple and space-saving manner.

What is claimed is:

1. A cylinder head (1) for an internal combustion engine, said cylinder head (1) comprising:
    a top face (1a), a bottom face (1b) arranged to be connected to a cylinder block, a lateral exhaust flange face (1c) arranged to be connected to an exhaust manifold (17), a second lateral face (id) being opposed to said lateral exhaust flange face (1c), a front face (1e) and an end face (1f);
    said cylinder head (1) being provided with a coolant chamber connected to outlet ports at which the coolant leaves the cylinder head to be connected to coolant ducts arranged outside of the cylinder head and an integral coolant crossover passage forming a return flow duct for coolant liquid which has passed the coolant chamber of the cylinder head; and
    said integral coolant crossover passage providing a first port (2a) for connection to a first exhaust manifold cooling jacket outlet (21d) and extending between said first port (2a) arranged at said lateral exhaust flange face (1c) and a first coolant outlet (2b) arranged at another of said faces (1a, 1b, 1d, 1e, 1f);
    wherein said first coolant outlet (2b) is arranged on said second lateral face (1d).

2. The cylinder head as recited in claim 1, wherein said second lateral face (1d) is an inlet flange face arranged to be connected to an intake manifold (7).

3. A cylinder head (1) for an internal combustion engine, said cylinder head (1) comprising:
    a top face (1a), a bottom face (1b) arranged to be connected to a cylinder block, a lateral exhaust flange face (1c) arranged to be connected to an exhaust manifold (17), a second lateral face (1d) being opposed to said lateral exhaust flange face (1c), a front face (1e) and an end face (1f);
    said cylinder head (1) being provided with a coolant chamber connected to outlet ports at which the coolant leaves the cylinder head to be connected to coolant ducts arranged outside of the cylinder head and an integral coolant crossover passage forming a return flow duct for coolant liquid which has passed the coolant chamber of the cylinder head; and
    said integral coolant crossover passage providing a first port (2a) for connection to a first exhaust manifold cooling jacket outlet (21d) and extending between said first port (2a) arranged at said lateral exhaust flange face (1c) and a first coolant outlet (2b) arranged at another of said faces (1a, 1b, 1d, 1e, 1f);
    wherein said cylinder head (1) is provided with an integral coolant short circuit passage (3) providing a second port (3a) for connection to a second exhaust manifold cooling jacket outlet (21e) and extending between said second port (3a) arranged at said lateral exhaust flange face (1c) and a second coolant outlet (3b) arranged at another of said faces (1a, 1b, 1d, 1e, 1f) for connection to a coolant pump inlet.

4. The cylinder head as recited in claim 3, wherein said second coolant outlet (3b) is provided at said bottom face (1b).

5. An internal combustion engine (11) comprising:
a cylinder block (14) having a plurality of cylinders (12) and a cylinder head (1) which includes a top face (1a), a bottom face (1b) connected to said cylinder block (14), a lateral exhaust flange face (1c) connected to an exhaust manifold (17), a second lateral face (1d) being opposed to said lateral exhaust flange face (1c), a front face (1e) and an end face (1f);
said exhaust manifold (17) being provided with a cooling jacket (18) having an first cooling jacket outlet (21d), wherein said cylinder head (1) is provided with an integral coolant crossover passage (2) providing a first port (2a) connected to said first cooling jacket outlet (21d) and extending between said first port (2a) arranged at said lateral exhaust flange face (1c) of said cylinder head (1) and a first coolant outlet (2b) arranged at another of said faces (1a, 1b, 1d, 1e, 1f);
wherein said first coolant outlet (2b) is arranged on said second lateral face (1d).

6. The internal combustion engine as recited in claim 5 wherein said second lateral face (1d) is an intake flange face connected to an intake manifold (7).

7. An internal combustion engine (11) comprising:
a cylinder block (14) having a plurality of cylinders (12) and a cylinder head (1) which includes a top face (1a), a bottom face (1b) connected to said cylinder block (14), a lateral exhaust flange face (1c) connected to an exhaust manifold (17), a second lateral face (1d) being opposed to said lateral exhaust flange face (1c), a front face (1e) and an end face (1f);
said exhaust manifold (17) being provided with a cooling jacket (18) having an first cooling jacket outlet (21d), wherein said cylinder head (1) is provided with an integral coolant crossover passage (2) providing a first port (2a) connected to said first cooling jacket outlet (21d) and extending between said first port (2a) arranged at said lateral exhaust flange face (1c) of said cylinder head (1) and a first coolant outlet (2b) arranged at another of said faces (1a, 1b, 1d, 1e, 1f);
wherein said integral coolant crossover passage (2) is connected to a coolant pump via a heat exchanger.

8. An internal combustion engine (11) comprising:
a cylinder block (14) having a plurality of cylinders (12) and a cylinder head (1) which includes a top face (1a), a bottom face (1b) connected to said cylinder block (14), a lateral exhaust flange face (1c) connected to an exhaust manifold (17), a second lateral face (1d) being opposed to said lateral exhaust flange face (1c), a front face (1e) and an end face (1f);
said exhaust manifold (17) being provided with a cooling jacket (18) having an first cooling jacket outlet (21d), wherein said cylinder head (1) is provided with an integral coolant crossover passage (2) providing a first port (2a) connected to said first cooling jacket outlet (21d) and extending between said first port (2a) arranged at said lateral exhaust flange face (1c) of said cylinder head (1) and a first coolant outlet (2b) arranged at another of said faces (1a, 1b, 1d, 1e, 1f):
wherein said cylinder head is provided with an integral coolant short circuit passage (3) providing a second port (3a) connected to an second outlet (21d) of said exhaust manifold cooling jacket (18) and extending between said second port (3a) arranged at said lateral exhaust flange face (1c) and a second coolant outlet (3b) arranged at another of said faces (1a, 1b, 1d, 1e, 1f) leading to a coolant pump inlet.

9. The internal combustion engine as recited in claim 8, wherein said second coolant outlet (3b) is provided at said bottom face (1b).

10. An internal combustion engine (11) comprising:
a cylinder block (14) having a plurality of cylinders (12) and a cylinder head (1) which includes a top face (1a), a bottom face (1b) connected to said cylinder block (14), a lateral exhaust flange face (1c) connected to an exhaust manifold (17), a second lateral face (1d) being opposed to said lateral exhaust flange face (1c), a front face (1e) and an end face (1f);
said exhaust manifold (17) being provided with a cooling jacket (18) having an first cooling jacket outlet (21d), wherein said cylinder head (1) is provided with an integral coolant crossover passage (2) providing a first port (2a) connected to said first cooling jacket outlet (21d) and extending between said first port (2a) arranged at said lateral exhaust flange face (1c) of said cylinder head (1) and a first coolant outlet (2b) arranged at another of said faces (1a, 1b, 1d, 1e, 1f);
wherein said cylinder head is provided with at least one coolant chamber (23) arranged for cooling a plurality of exhaust channels (5a-5i) provided in said cylinder head (1) arranged for leading exhaust eases from said plurality of cylinders (12), and wherein said lateral exhaust flange face (1c) is provided with at least one outlet port (6a-6d) for each cylinder in said plurality of cylinders (12), said outlet ports (6a-6d) being connected to said coolant chamber (23) and provide connections to a corresponding set of inlets (22a-22d) arranged on said exhaust manifold cooling jacket (18);
wherein said exhaust manifold cooling jacket (18) is divided by a partitioning wall (19) into a coolant inlet duct (20) and a coolant outlet duct (21), said coolant inlet duct (20) being connected to said set of inlets (22a-22d) arranged on said exhaust manifold cooling jacket (18) and leading to an outlet opening (20a) of said coolant inlet duct (20); and
wherein said outlet opening (20a) of said coolant inlet duct (20) is connected to an inlet opening (27) to a coolant chamber (28) arranged in a turbo charger assembly (26).

11. An internal combustion engine (11) comprising:
a cylinder block (14) having a plurality of cylinders (12) and a cylinder head (1) which includes a top face (1a), a bottom face (1b) connected to said cylinder block (14), a lateral exhaust flange face (1c) connected to an exhaust manifold (17), a second lateral face (1d) being opposed to said lateral exhaust flange face (1c), a front face (1e) and an end face (1f);
said exhaust manifold (17) being provided with a cooling jacket (18) having an first cooling jacket outlet (21d), wherein said cylinder head (1) is provided with an integral coolant crossover passage (2) providing a first port (2a) connected to said first cooling jacket outlet (21d) and extending between said first port (2a) arranged at said lateral exhaust flange face (1c) of said cylinder head (1) and a first coolant outlet (2b) arranged at another of said faces (1a, 1b, 1d, 1e, 1f);
wherein said cylinder head is provided with at least one coolant chamber (23) arranged for cooling a plurality of exhaust channels (5a-5i) provided in said cylinder head (1) arranged for leading exhaust eases from said plurality of cylinders (12), and wherein said lateral exhaust flange face (1c) is provided with at least one outlet port (6a-6d) for each cylinder in said plurality of cylinders (12), said outlet ports (6a-6d) being connected to said coolant chamber (23) and provide connections to a corresponding set of inlets (22a-22d) arranged on said exhaust manifold cooling jacket (18);

wherein said exhaust manifold cooling jacket (18) is divided by a partitioning wall (19) into a coolant inlet duct (20) and a coolant outlet duct (21), said coolant inlet duct (20) being connected to said set of inlets (22a-22d) arranged on said exhaust manifold cooling jacket (18) and leading to an outlet opening (20a) of said coolant inlet duct (20);

wherein said coolant outlet duct (21) extends between an inlet opening (21a) of said coolant outlet duct (21) and said first cooling jacket outlet (21d); and wherein said inlet opening (21a) of said coolant outlet duct (21) is connected to an outlet opening (29) from a coolant chamber (28) arranged in a turbo assembly (26).

12. An internal combustion engine (11) comprising:

a cylinder block (14) having a plurality of cylinders (12) and a cylinder head (1) which includes a top face (1a), a bottom face (1b) connected to said cylinder block (14), a lateral exhaust flange face (1c) connected to an exhaust manifold (17), a second lateral face (1d) being opposed to said lateral exhaust flange face (1c), a front face (1e) and an end face (1f);

said exhaust manifold (17) being provided with a cooling jacket (18) having an first cooling jacket outlet (21d), wherein said cylinder head (1) is provided with an integral coolant crossover passage (2) providing a first port (2a) connected to said first cooling jacket outlet (21d) and extending between said first port (2a) arranged at said lateral exhaust flange face (1c) of said cylinder head (1) and a first coolant outlet (2b) arranged at another of said faces (1a, 1b, 1d, 1e, 1f); p1 wherein said cylinder head is provided with at least one coolant chamber (23) arranged for cooling a plurality of exhaust channels (5a-5i) provided in said cylinder head (1) arranged for leading exhaust eases from said plurality of cylinders (12), and wherein said lateral exhaust flange face (1c) is provided with at least one outlet port (6a-6d) for each cylinder in said plurality of cylinders (12), said outlet ports (6a-6d) being connected to said coolant chamber (23) and provide connections to a corresponding set of inlets (22a-22d) arranged on said exhaust manifold cooling jacket (18);

wherein said exhaust manifold cooling jacket (18) is divided by a partitioning wall (19) into a coolant inlet duct (20) and a coolant outlet duct (21), said coolant inlet duct (20) being connected to said set of inlets (22a-22d) arranged on said exhaust manifold cooling jacket (18) and leading to an outlet opening (20a) of said coolant inlet duct (20); and wherein said coolant inlet duct (20) and coolant outlet duct (21) are flow connected via at least one bypass opening (24).

13. The internal combustion engine as recited in claim 12, wherein at least one bypass (24) opening is provided per cylinder (12).

* * * * *

UNITED STATES PATENT AND TRADEMARK OFFICE
CERTIFICATE OF CORRECTION

PATENT NO. : 7,430,994 B2
APPLICATION NO. : 11/306184
DATED : October 7, 2008
INVENTOR(S) : Wolfgang Petutsching et al.

Page 1 of 1

It is certified that error appears in the above-identified patent and that said Letters Patent is hereby corrected as shown below:

Title Page, Item (75)
Inventors: should read: Wolfgang PETUTSCHING; Karl KIRCHWEGER; Rickard STEFANSSON; Bertil ANDERSSON Signed and Sealed this Twenty-sixth Day of May, 2009

JOHN DOLL
*Acting Director of the United States Patent and Trademark Office*